United States Patent

Afman et al.

[11] Patent Number: 5,908,648
[45] Date of Patent: Jun. 1, 1999

[54] METHOD OF PRODUCING FULLY COOKED AND BREADED BONE-IN POULTRY PRODUCT

[75] Inventors: Brent J. Afman, Munster, Ind.; Jerry L. Hope, St. Charles, Ill.; Robert W. Fischer, Berwyn, Ill.; Bhupinder K. Girdhar, Oak Brook, Ill.; Patricia E. Tometich, Oak Lawn, Ill.

[73] Assignee: OSI Industries, Inc., Aurora, Ill.

[21] Appl. No.: 08/734,812

[22] Filed: Oct. 22, 1996

[51] Int. Cl.[6] .................................................. A23L 1/315
[52] U.S. Cl. .............................. 426/92; 426/96; 426/281; 426/296; 426/438
[58] Field of Search ................................ 426/92, 96, 281, 426/289, 296, 438, 523, 524

[56] References Cited

U.S. PATENT DOCUMENTS

| | | | |
|---|---|---|---|
| 4,511,583 | 4/1985 | Olson et al. | 426/302 X |
| 4,940,590 | 7/1990 | Williams et al. | 426/92 |
| 5,266,339 | 11/1993 | Samson et al. | 426/302 X |

Primary Examiner—Milton Cano
Attorney, Agent, or Firm—Wallenstein & Wagner Ltd.

[57] ABSTRACT

Methods for producing a fully cooked and breaded bone-in poultry product, such as chicken, in which the steps of pre-dusting, batter, breading and par-frying are performed in advance of full cooking in a vapor cooker.

12 Claims, 1 Drawing Sheet

METHOD OF PRODUCING FULLY COOKED AND BREADED BONE-IN POULTRY PRODUCT

DESCRIPTION

1. Technical Field

The present invention generally relates to methods for large scale commercial processing of poultry products for retail distribution and, in particular, to a process for producing a fully cooked, breaded poultry product, such as bone-in-chicken, having a high moisture content.

2. Background of the Invention

Conventional in-plant processing of breaded and flash frozen, bone-in poultry product for final preparation by the end user may take several forms. In one method, fresh, but frozen product is produced by marinating the product with seasonings, applying batter to the product surfaces, breading the batter surfaces and flash freezing the product. In conventional commercial fryers this requires a fry time of about 14 minutes. Such food preparation times are unacceptable for fast food or counter service restaurants.

If fully cooked product is desired, then the poultry product is marinated such as by injecting with a selected marinade, fully cooked within the moist environment of a convection vapor cooker, pre-dusted, battered, breaded, par-fried and flash frozen. The advantage of this method is that a restaurant need only gradually thermalize the product to a near cooking temperature of about 140 degrees Fahrenheit and then subject the product to brief frying of no more than about 90 seconds to crisp and finish the product. Such frying can take place based on product demand. However, a disadvantage of this method is that some end users find the finished product not sufficiently moist and juicy. This may be the result of moisture being removed from the product due to the product being par-fried after it is vapor cooked. It may also result from the combined dwell times of vapor cooking and par-frying.

For example, typical initial internal temperatures for unfrozen, bone-in chicken product is about 40 to 45 degrees Fahrenheit. Vapor cooking must elevate this internal temperature to at least 160 degrees (the U.S.D.A. minimum) and preferably to about 185–186 degrees Fahrenheit. This requires cooker dwell times of at least 22 minutes for wing pieces and 30 minutes for thigh and drum pieces. To achieve par-frying requires fryer dwell times of at least another 30 seconds. These dwell times, coupled with the knowledge that cooking itself renders both moisture from the product and fat from the skin, are likely contributors to the perceived dryness of poultry products processed by this method.

However, the process of hot water or vapor cooking creates conditions adverse to the coating of a fully breaded product. Hence, it was not believed possible to fully batter, bread, and par-fry a bone-in poultry product that would withstand the rigors of such cooking conditions.

Prior to the development of the present invention, a need existed for a process of producing fully cooked breaded and frozen bone-in poultry, such as chicken, which results in a moist and juicy product yet requires minimal frying time by the end user.

SUMMARY OF THE INVENTION

According to the present invention an in-plant commercial scale process has been developed for producing a fully cooked and breaded bone-in poultry product, such as chicken, delivered frozen to the end user which requires minimal frying time by the end user yet yields a moist and juicy product. In the broader aspects of the present invention the steps of batter, breading and par-frying are performed in advance of full cooking in a steam cooker. As a result, the internal temperature of the product is gradually elevated from initial temperatures of 40–45 degrees Fahrenheit, to about 80 degrees Fahrenheit at the par-frying step, to about 185 degrees at the cooking stage before being rapidly brought to 0 degrees Fahrenheit at the stage of product freezing. This results in an average reduction of the combined dwell time for par-frying and cooking of about 10%. Further by par-frying before cooking, moisture can be sealed into the product. As a result of reduced dwell time and par-frying before cooking, the end product contains more moisture and juice even though a reduction in the quantity of injected marinade can be achieved.

However, because the batter and breading steps occur before cooking, a more specific aspect of the present invention is directed to the composition of the powder used for pre-dusting as well as the composition of the batter and breading. Here, the present invention requires the inclusion of a high percentage of egg white powder relative to flour in the pre-dust powder and in the batter powder and breading composition. This allows the coated product to withstand the cooking environment of commercial vapor cooking.

Other advantages and aspects of the present invention will become apparent upon review of the drawing and upon reading the following of the invention.

DETAILED DESCRIPTION

Figure 1:
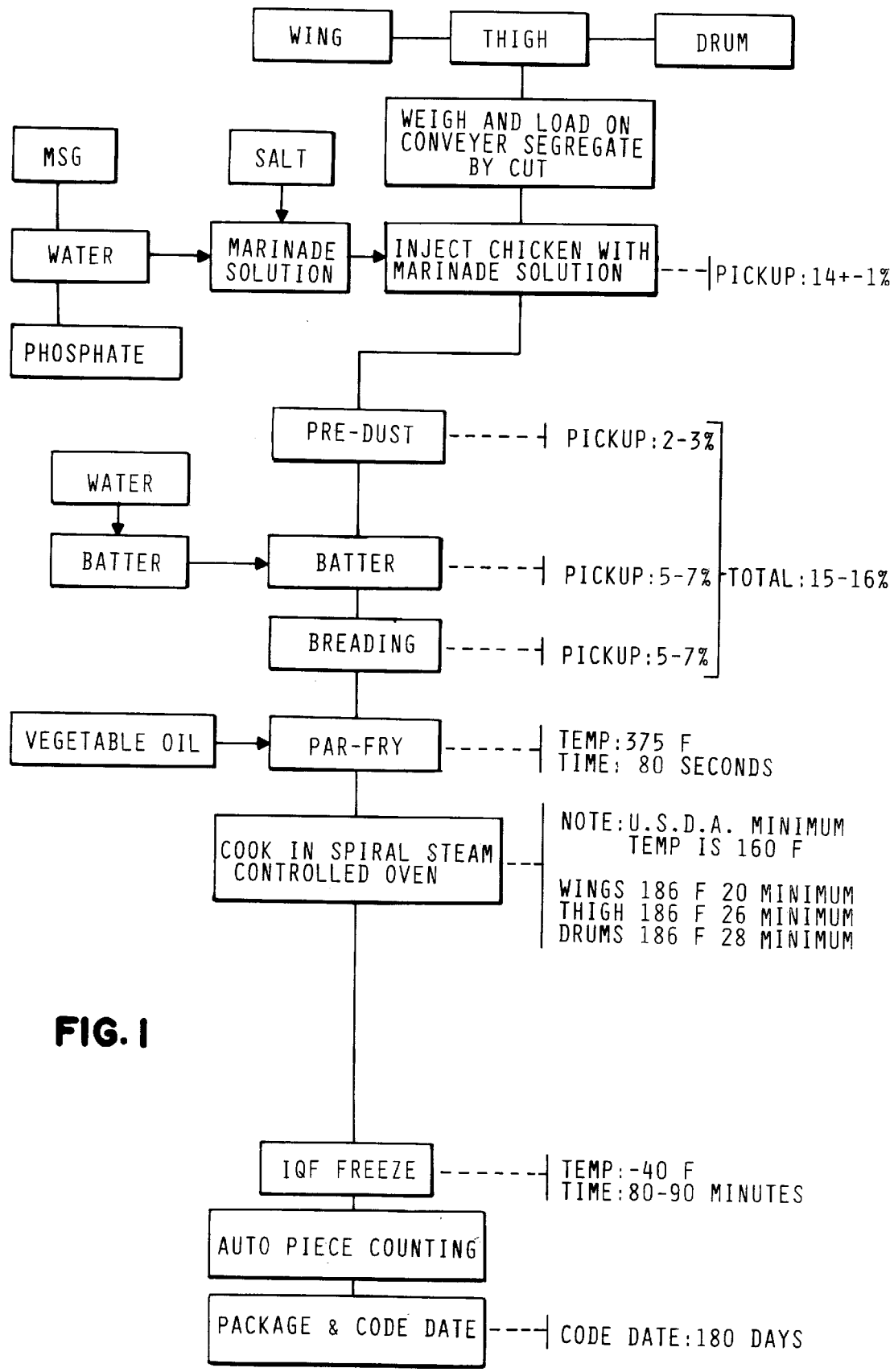
FIG. 1 is a flowchart describing the preferred embodiment of the present invention.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiments illustrated.

As generally described in FIG. 1, the method of the present invention involves using unfrozen chicken pieces comprising wing, thigh and drum pieces. These pieces will have initial internal temperatures of 40 to 45 degrees Fahrenheit.

These pieces are then marinated by preferably by direct injection into each piece. However, other marinading methods may be used such as by soaking or tumbling. About 13% to 15% by weight of a marinade solution is injected and made from salt, phosphate and water in proportions and in amounts commonly found in the art. Monosodium glutamate may also be included if desired. The amount of marinade injected is typically less than the quantities used in other methods.

Next, each piece is pre-dusted with a dry composition described in the Example below. It is important that 2.5% to 3.0% pick-up of the pre-dust powder is achieved and that dusting occurs over the entire surface of the product. Also important to the coating step of the present invention is the use of a pre-dust composition having egg white powder. The pre-dust powder must have a ratio of flour to egg white powder in the range of 1:1 to 3:1. This allows for any product coating to have adequate adhesion and resistance to the conditions of the vapor cooking environment.

As disclosed in FIG. 1, the preferred coating of the present invention is a batter followed by breading. The composition of the batter and breading is disclosed in the Example below. Batter viscosity should be carefully monitored with attention paid to batter temperature parameters. As understood in the art, even coating coverage is important to the final finish of the product.

After the coating step is completed, the step of par-frying comprises submerging each piece in a frying medium having a temperature ranging from about 350 to 375 degrees Fahrenheit and for a time period of about 80 to 120 seconds. Internal product temperature is increased to preferably about 80 degrees Fahrenheit. The frying medium may include any of those known in the art such as beef tallow or vegetable oil. An advantage of the method of the present invention is the step of par-frying in advance of the step of full cooking of the product. This seals in the product moisture and prevents fat from being rendered from the skin during the cooking process.

After par-frying, the internal product temperature is again elevated by exposing the par-fried breaded product to a moisture controlled cooking environment such as a linear steam cooker or a spiral steam cooker. FIG. 1 and the Example discloses the minimum dwell times to achieve internal product temperatures for wing, thigh and drum pieces.

Once the product is fully cooked, freezing of the product occurs, preferably using IQF freezing. Because the internal product temperature is relatively high, loner dwell times, of at least 70 minutes at −40 degrees Fahrenheit are necessary to achieve an internal product temperature of 0 degrees Fahrenheit.

The following Example discloses, in greater detail, a preferred method of the present invention.

EXAMPLE

Starting Product: Fresh Chicken in drum; thigh and wing pieces

| Injection: | |
|---|---|
| Marination Ingredients: | water, phosphate, monosodium glutamate and salt commonly used in proportions |
| Marination Composition: | 400 lb (50 gal) water: 27.5 lb dry marinade |
| Injection %: | 14.0 ± 2.0% |
| Product temp: | 40–45 F. (5–8 C.) |
| PreDust: | |
| Ingredients: | wheat flour, egg white powder, rice flour, isolate soy protein, modified starch, salt, baking powder. Wheat flour and egg white powder must be present in a range from 1:1 to 3:1. All other ingredients in proportions commonly found in the art. |
| Target Pickup %: | 3.0 ± 1.0% |
| Batter: | |
| Ingredients: | wheat flour, modified starch, egg white powder, corn flour, salt, baking powder in commonly used proportions |
| Batter: Water: | 3:1 |
| Target Pickup %: | 6.0 ± 2.0% |
| Batter Temp: | 40–50 F. |
| Viscosity: | 14 ± 1 sec |
| Breading: | |
| Ingredients: | wheat flour, corn flour, modified starch, egg white powder, salt, baking powder in commonly used proportions |
| Target Pickup %: | 6.0 ± 2.0% |
| Panfrying: | |
| Ingredients: | commonly used frying medium such as beef tallow or vegetabie oil |
| Dwell Time.: | 1.5 min |
| Fryer Temperature: | 375 F. (190 C.) |
| Product Temp: | 80 F. (23–37 C.) |
| Spiral Cooker Steam Oven: | |
| Oven Dry Bulb: | 350 F. (176–177 C.) |
| Oven Wet Bulb: | 185 F (85 C.) |
| Humidity: | 63% |
| Dwell Time: | 20 minutes for wing pieces 26 minutes for thigh pieces 28 minutes for drum pieces |
| Product Temp: | Minimum 105 F. (85 C.) |
| Freezing | |
| Dwell Time: | 80 min |
| Freezer Temp: | −40 F. |
| Product Temp: | 0 F. (−18 C.) |

The foregoing Example discloses the steps taking place for in-plant processing of a fully cooked and breaded bone-in poultry product. The commercial end user then gradually raises the internal temperature of the product preferably in a thermalizing convection cabinet such as that available through Carter-Hoffman. A 2.5 hour dwell time within the cabinet in cabinet air temperature of 165 degrees Fahrenheit is necessary to achieve internal product temperatures of about 130–140 degrees Fahrenheit. As consumer demands require, the thermalized product is surface finished by flash frying for 90 seconds at fryer temperatures of about 365 degrees Fahrenheit. This results in the product having final end user internal temperatures of about 145 degrees Fahrenheit. While the specific embodiments have been illustrated and described, numerous modifications come to mind without significantly departing from the spirit of the invention and the scope of protection is only limited by the scope of the accompanying claims.

We claim:

1. A method of producing a fully cooked and coated individual piece bone-in poultry product comprising the steps of:

marinating each piece with a seasoned solution;
dusting each piece with a dusting powder which includes flour and egg white powder in proportions ranging from 1 part flour to 1 part egg white powder to 3 parts flour to 1 egg white powder;

applying a layer of a selected coating to the surface of each piece;

frying each piece for a limited time and temperature sufficient to par-fry each piece;

exposing each par-fried piece to a source of heated water vapor for a time and temperature sufficient for each piece to reach internal temperatures of at least 160 degrees Fahrenheit; and, immediate freezing of each piece.

2. The method described in claim 1 wherein the step of par-frying comprises submerging each piece in a frying medium having a temperature ranging from about 350 to 375 degrees Fahrenheit and for a time period of about 80 to 120 seconds.

3. The method described in claim 1 wherein the step of exposing each par-fried piece to a source of heated water vapor includes:

cooking the par-fried pieces in a moisture controlled oven.

4. The method described in claim 1 wherein the moisture controlled oven includes a spiral steam oven.

5. The method of claim 1 wherein the poultry pieces include at least wing pieces, thigh pieces and drum pieces.

6. The method of claim 5 wherein the step of exposing each par-fried piece to a source of heated water vapor includes:

cooking each thigh piece for a minimum of 26 minutes and at least at 350 degrees Fahrenheit.

7. The method of claim 5 wherein the step of exposing each par-fried piece to a source of heated water vapor includes:

cooking each drum piece for a minimum of 28 minutes and at least at 350 degrees Fahrenheit.

8. The method of claim 5 wherein the step of exposing each par-fried piece to a source of heated water vapor includes:

cooking each wing piece for a minimum of 20 minutes and at least at 350 degrees Fahrenheit.

9. The method of claim 1 wherein the step of marinating each piece includes the step of injecting a liquid marinading solution into each piece.

10. The method described in claim 1 wherein bone-in poultry product includes chicken.

11. The method described in claim 1 wherein the step of coating further includes the steps of:

applying a layer of a batter to the surface of each piece; and, applying a breading layer onto the batter layer of each piece.

12. A method of producing a fully cooked and breaded individual piece bone-in poultry product comprising the steps of:

providing pieces of unfrozen chicken having internal temperatures of about 40 to 45 degrees Fahrenheit;

injecting each piece with a marinade solution;

coating the surface of each piece with a breading layer;

frying each breaded piece for a limited time and temperature sufficient for each piece to reach an internal temperature of about 80 degrees Fahrenheit;

exposing each fried piece to a source of heated water vapor for a time and temperature sufficient for each piece to reach an internal temperature of at least 185 degrees Fahrenheit; and, immediate freezing of each piece sufficient for each piece to reach an internal temperature of 0 degrees Fahrenheit.

* * * * *